United States Patent [19]

Matsumoto et al.

[11] 3,903,004

[45] Sept. 2, 1975

[54] METHOD OF PREPARING MAGNETIC POWDER OF COBALT-SUBSTITUTED GAMMA-FERRIC OXIDE

[75] Inventors: Keiji Matsumoto, Osaka; Yoshihiro Matsuo, Neyagawa, both of Japan

[73] Assignee: Matsushita Electric Industrial Co., Ltd., Japan

[22] Filed: Sept. 7, 1973

[21] Appl. No.: 394,998

[30] Foreign Application Priority Data

| | | |
|---|---|---|
| Sept. 7, 1972 | Japan | 47-90229 |
| Sept. 7, 1972 | Japan | 47-90230 |
| Sept. 7, 1972 | Japan | 47-90231 |
| Sept. 7, 1972 | Japan | 47-90232 |
| Sept. 7, 1972 | Japan | 47-90233 |
| Sept. 7, 1972 | Japan | 47-90244 |
| Sept. 20, 1972 | Japan | 47-94773 |
| Sept. 20, 1972 | Japan | 47-9[illegible]775 |

[52] U.S. Cl. ....... 252/62.58; 252/62.56; 252/62.59; 252/62.6; 252/62.61; 252/62.62; 252/62.63

[51] Int. Cl. .......... C04b 35/00

[58] Field of Search .......... 252/62.51, 62.56, 67.58, 252/62.59, 62.6, 62.61, 62.62, 62.63

[56] References Cited

UNITED STATES PATENTS

| | | | |
|---|---|---|---|
| 3,075,919 | 1/1963 | Gruber et al. | 252/62.62 |
| 3,399,142 | 8/1968 | Conley | 252/62.56 |

*Primary Examiner*—Jack Cooper
*Attorney, Agent, or Firm*—Wenderoth, Lind & Ponack

[57] ABSTRACT

The present invention relates to improved cobalt-substituted γ-ferric oxide magnetic powder suitable for application in magnetic recording. Said powder comprises a batch composition which is characterized by addition of controlled amounts of at least one compound selected from the group of $NH_4$, Cu, Li, Pb, Sn, Ba, Cd, Sr and In halide compounds to the mixture of acicular powder of goethite with a controlled amount of cobalt compound, said batch composition being mixed, heated at a temperature from 300° to 600°C in a reducing gas atmosphere, and finally oxidized at a temperature from 150°C to 350°C in air or oxygen gas atmosphere.

14 Claims, 3 Drawing Figures

METHOD OF PREPARING MAGNETIC POWDER OF COBALT-SUBSTITUTED GAMMA-FERRIC OXIDE

BACKGROUND OF THE INVENTION

This invention relates to magnetic powder, and more particularly to γ-ferric oxide magnetic powder suitable for application in magnetic recording tapes with the provision of improved storage temperature characteristics and to a method for manufacturing the same.

It has heretofore been suggested that cobalt-substituted γ-ferric oxide could be used in the manufacture of magnetic recording tapes, particularly those intended to record video signals. Cobalt-substituted γ-ferric oxide has a high coercive force and satisfactory electromagnetic conversion characteristics such as frequency response, signal to noise ratio, and the like. However, magnetic tapes employing cobalt-substituted γ-ferric oxide magnetic powder exhibit poor storage temperature characteristics which arise from a large temperature dependency of the coercive force of cobalt-substituted γ-ferric oxide magnetic powder.

This disadvantage is not shared by some of the magnetic powders such as chromium dioxide, $CrO_2$. Magnetic tapes made with such magnetic powders have the advantage over cobalt-substituted γ-ferric oxide magnetic powders in that the former is substantially independent of storage temperature characteristics. Consequently, if the cobalt-substituted γ-ferric oxide system could be modified so that its coercive force is no longer dependent upon temperature changes, this material would be effectively competitive with the chromium dioxide.

SUMMARY OF THE INVENTION

An object of this invention, therefore, is to provide cobalt-substituted γ-ferric oxide magnetic powder having a high coercive force and small temperature dependency of coercive force.

Another object of this invention is to provide cobalt-substituted γ-ferric oxide magnetic powder having a high coercive force, a high remanent induction, and small temperature dependency of coercive force.

Another object of this invention is to provide the method of manufacturing cobalt-substituted γ-ferric oxide magnetic powder having a high coercive force, and small temperature dependency of coercive force.

These objects are achieved by providing an improved cobalt-substituted γ-ferric oxide magnetic powder according to the present invention, which comprises a batch composition which consists essentially of 0.425 to 9.95 mol. % of cobalt compound, 0.5 to 15 mol.% of at least one compound selected from the group consisting of $NH_4$ Cl, CuCl, LiCl, $PbCl_2$, $SnCl_2$, $BaCl_2$, $CdCl_2$, $SrCl_2$ and $InCl_3$, and 75.05 to 99.075 mol.% of acicular powder of goethite. Said cobalt compound is at least one member selected from the group consisting of $CoSo_4$, $CoCl_2$, $Co(NO_3)_2$ and $Co(CH_3COO)_2$ which is soluble in water. Said compound selected from said group of chloride can have Br, I or F substituted for Cl.

A method of preparing the improved cobalt-substituted γ-ferric magnetic powders is as follows. Acicular powder of goethite is dispersed into an aqueous solution of cobalt compound such as $CoSo_4$. A precipitating reagent such as NaOH is added to the aqueous solution being stirred in order to precipitate all of the cobalt ions in the form of cobalt hydroxide. Then, the mixture of goethite and cobalt hydroxide is filtered, washed, dried, further mixed with at least one compound selected from the group of haloid compounds. The final mixture of goethite, cobalt hydroxide, and haloid is heated at a temperature from 300°C to 600°C in a reducing gas atmosphere, and finally oxidized at a temperature from 150°C to 350°C in air or oxygen gas atmosphere.

BRIEF DESCRIPTION OF THE DRAWINGS

These and other objects and features of the invention will be apparent upon consideration of following detailed description taken together with accompanying drawing wherein.

DETAILED DESCRIPTION OF THE INVENTION

Figure 1:
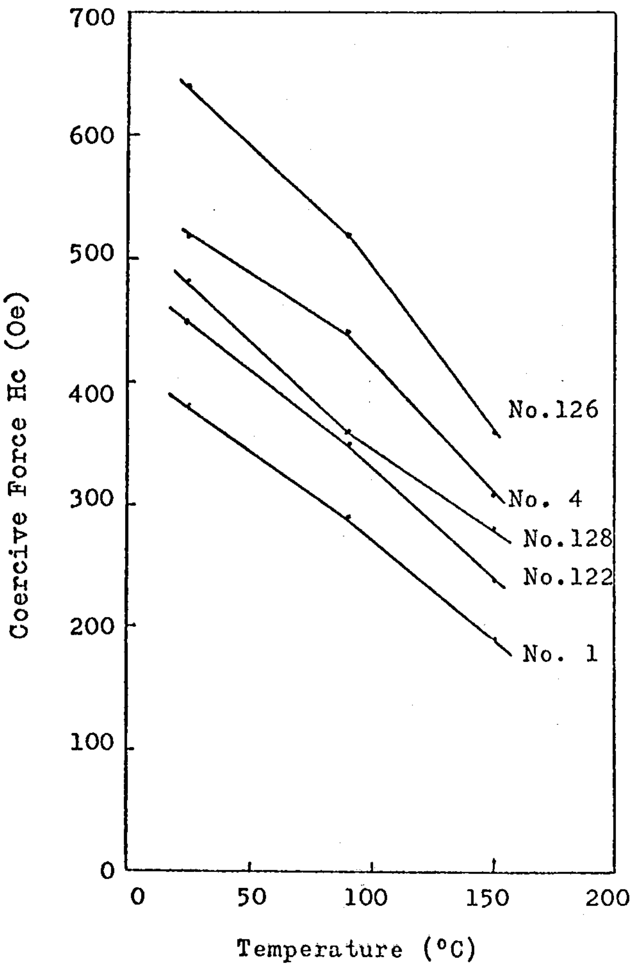
FIG. 1 is a graph showing temperature dependency of coercive force with a parameter of additive amounts of CuCl for cobalt substituted γ-ferric oxide.

Improved cobalt-substituted γ-ferric oxide magnetic powder according to the present invention comprises a batch composition which consists essentially of 0.425 to 9.95 mol.% of cobalt compound, 0.5 to 15 mol.% of at least one compound selected from the group consisting of $NH_4Cl$, CuCl, LiCl, $PbCl_2$, $SnCl_2$, $BaCl_2$, $CdCl_2$, $SrCl_2$, and $InCl_3$, and 75.05 to 99.05 mol.% of acircular powder of goethite.

The compositions claimed can not be defined by the composition finally obtained after heat-treatment, but by the batch composition as a starting mixture before heat-treatment.

The reason is due to the difficulty of determining exactly the final composition, because crystallographic sites which added metal ions and added chlorine ions occupy in crystal lattice of γ-$Fe_2O_3$ is unknown and because vaporization of some of added chlorine during heat treatment occurs thereby changing the composition.

Said cobalt compound is desirably water-soluble such as $CoSO_4$, $CoCl_2$, $Co(NO_3)_2$, and $Co(CH_3COO)_2$.

Said chlorine ions in said compound selected from the said group can be substituted by bromine, iodine, or fluorine. That is, the compounds are $NH_4Br$, CuBr, LiBr, $PbBr_2$, $SnBr_2$, $BaBr_2$, $CdBr_2$, $SrBr_2$, $InBr_3$, $NH_4I$, CuI, LII, $PbI_2$, $SnI_2$, $CdI_2$, $SrI_2$, $InI_3$, $NH_4F$, CuF, LiF, $PbF_2$, SnF2, $BaF_2$, $CdF_2$, $SrF_2$, or $InF_3$.

A method of manufacturing improved magnetic powder according to the present invention comprises essentially of dispersing acicular powder of goethite into an aqueous solution of said cobalt compound, precipitating all of the cobalt ions in a form of cobalt hydroxide by addition of a percipitating reagent such as NaOH aqueous solution into the aqueous solution of said cobalt compound, filtering the mixture of goethite and cobalt hydroxide, drying the mixture, mixing at least one compound selected from the said group of haloid compounds with the mixture of goethite and cobalt hydroxide, heating the final mixture at a temperature from 300°C to 600°C in a reducing gas atmosphere such as $H_2$—$N_2$ mixed gases, and finally oxidizing the final mixture at a temperature from 150°C to 350°C in air or oxygen gas atmosphere.

Said precipitated cobalt hydroxide is adjusted to an atomic percent of 0.5 to 10.0% of Co and 90.0 to 99.5% of Fe.

The total amount of said one compound selected from the said group of haloid is 0.5 to 15 mol.% in respect to 85 to 99.5 mol.% of mixture of goethite and cobalt hydroxide.

This corresponds to a batch composition consisting of 0.425 to 9.95 mol.% of cobalt compound, 0.5 to 15 mol.% of haloid compound, and 75.05 to 99.075 mol.% of goethite

EXAMPLES

Additions of many chloride compounds were attempted in preparation of cobalt-substituted $\gamma$-ferric oxide. 500 gram of acicular powders of goethite with the size of 0.4 to 0.6 $\mu$m in length and 0.06 to 0.08 $\mu$m in width were dispersed into 10 liters of aqueous solution containing 26.9 gram of $CoSO_4$. Their amounts are in the atomic ratio of 97 atomic % Fe and 3 atomic % Co. Ammonia water was added to the goethite-dispersed aqueous solution of $CoSO_4$ until the pH of the aqueous solution became more than 10, and then stirring of the solution was maintained for ten minutes. It resulted that all of the cobalt ions in the solution were precipitated in the form of cobalt hydroxide. The mixtures of 97 mol.% of goethite and 3 mol.% of cobalt hydroxide were filtered, washed with pure water, and dryed at a temperature of 90°C for 6 hours.

Then, one compound selected from the chloride group was added to a 10g batch of the mixture of goethite and cobalt hydroxide. The added amounts of said one compound are shown in the following parentheses; the former is in the molar ratio of 3 mol.% of chloride and 97 mol.% of the mixture of goethite and cobalt hydroxide, and the later is in the molar ratio of 10 mol.% of chloride and 90 mol.% of the mixture of goethite and cobalt hydroxide. The said chloride group consists of $NH_4Cl$ (0.186g and 0.668g), CuCl (0.344g and 1.236), LiCl (0.147g and 0.529g), $PbCl_2$ (0.967g and 3.473g), $SnCl_2$ (0.659g and 2.368g), $BaCl_2$ (0.724g and 2.600g), $CdCl_2$ (0.637g and 2.889g), $SrCl_2$ (0.510g and 1.980), $InCl_3$ (0.769g and 2.762g), AgCl (0.498g and 1.790g), KCl ( 0.259g and 0.931g), NaCl (0.203g and 0.730g), $NiCl_2$ (0.451g and 1.619g), $PdCl_2$ (0.616g and 2.214g), $ZnCl_2$ (0.474g and 1.702g), $CaCl_2$ (0.386g and 1.386g), $MgCl_2$ (0.331g and 1.189g), $MnCl_2$ (0.437g and 1.571g), $YCl_3$ (0.679g and 2.438g), $GdCl_3$ (0.916g and 3.292g), and $LaCL_3$ (0.853g and 3.063g). The batch compositions consisting of goethite, cobalt hydroxide, and chloride compound were intimately mixed with a small amount of pure water using agate mortar, and then dryed at a temperature of 90°C for 2 hours to be free from water.

The final mixtures of the batch composition were heated at a temperature of 450°C for 1 hour in the atomosphere of 10%$H_2$—90%$N_2$ gas flow. During the heat treatment, goethite ($\alpha$-FeOOH) was converted to magnetite ($Fe_3O_4$) containing Co, Cl, and the other added ions.

Then, the magnetite powders were heated up to 250°C at the rate of 100°C/H in air and kept at 250°C for 5 hours in air to be converted to maghemetite ($\gamma$-$Fe_2O_3$) containing Co, Cl, and the other added ions.

For each sample, the coercive force Hc and remanent induction Br were determined from measurements of B-H curve at different temperatures, and shown in Table 1 and Table 2.

A group of additives in Table 1 have effects to increase coercive force and decrease a temperature dependency of coercive force. All of the values of the coercive force at 25°C are larger than 380 Oe, which is the value of coercive force at 25°C for $\gamma$-$(Fe_{0.97}Co_{0.03})_2O_3$ powders with no additive. On the other hand, a group of additives in Table 2 have no effect to increase coercive force.

Table 3 shows experimental results with variation of added amounts of CuCl from 0.2 mol.% to 20 mol.%, fixing doped amounts of Co to be 3 atomic %. Table 4 and Table 5 are in cases of variation of added amounts of $PbCl_2$ and $InCl_3$, respectively, with a fixed 3 atomic % of Co. All of the samples were prepared in the same process as mentioned above. As seen in these tables, additions of CuCl, $PbCl_2$, and $InCl_3$ to be from 0.5 mol.% to 15 mol.% have the effect of increasing coercive force and decreasing temperature dependency of the coercive force. Also, in cases of the other additives shown in Table 1, the same effects were observed in the added amounts from 0.5 mol.% to 15 mol.% The beneficial effects of CuCl additions are shown in FIG. 1.

Next, examples were run with variation of doped amounts of Co from 0.2 atomic % to 15 atomic %, fixing added amounts of CuCl to be 3 mol.% and 10 mol.%, shown in Table 6 and Table 7, respectively. The Co amount more than 0.5 atomic % is favorable to obtain the coercive force larger than 380 Oe. The Co amount smaller than 10 atomic % is favorable to obtain a small temperature dependency of coercive force, that is more than about 70% of the ratio coercive force at 80°C to that at 25°C. This limitation to Co amounts was applied in cases of the other additions in Table 1.

Figure 2:
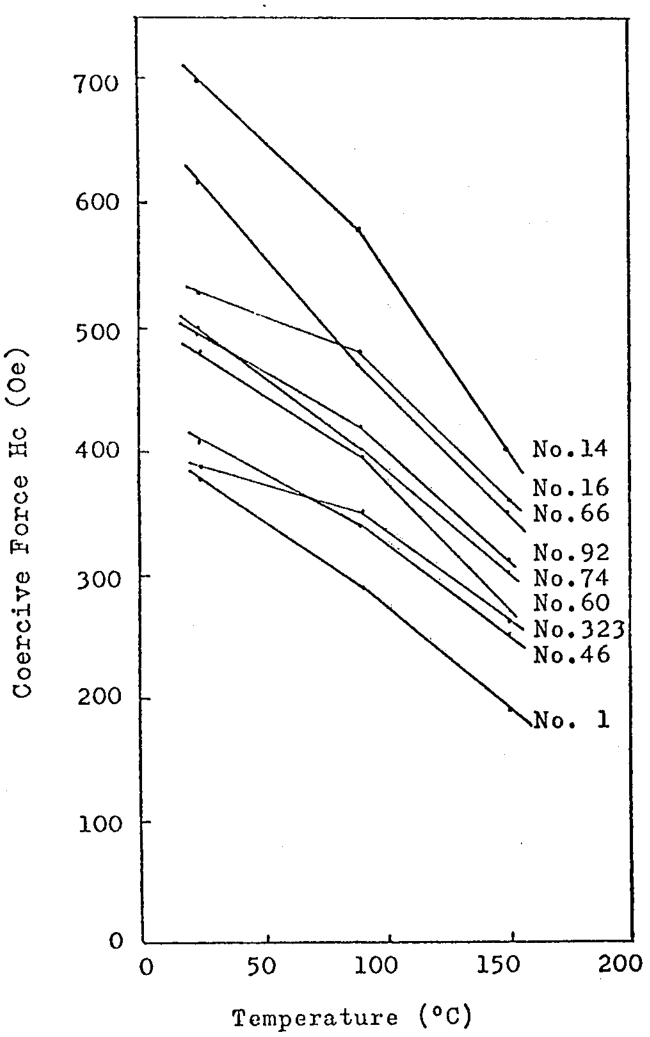
FIG. 2 is a graph showing a temperature dependency of coercive force for coventional cobalt-substituted γ-ferric oxide and improved cobalt-substituted γ-ferric oxide with some additives.

Next, examples were run with substitution of F, Br, and I ions for Cl ion of eight kinds of additives in Table 1, fixing doped amounts of Co to be 3 atomic %. All of the halogen additives, shown in Table 8, have the effect of increasing the coercive force to more than 380 Oe and to decreasing temperature dependency of the coercive force. The beneficial effects of some additives are shown in FIG. 2.

Table 9 shows experimental results with variation of added amounts of copper bromide, copper iodide, and copper flouride from 0.2 mol.% to 20 mol.%, fixing doped amounts of cobalt to be 3 atomic %. All of the sample were prepared in the same process as mentioned above. As seen in this table, additions of CuBr, CuI, and CuF from 0.5 mol.% to 15 mol.% have the effect of increasing coercive force and decreasing temperature dependency of the coercive force. Also, in case of the other additives shown in Table 8, the same beneficial effects were observed in the added amounts from 0.5 mol.% to 15 mol.%. Furthermore, the beneficial effects were observed in the limited amount of doped Cobalt ion to be from 0.5 atomic to 10 atomic %.

Figure 3:
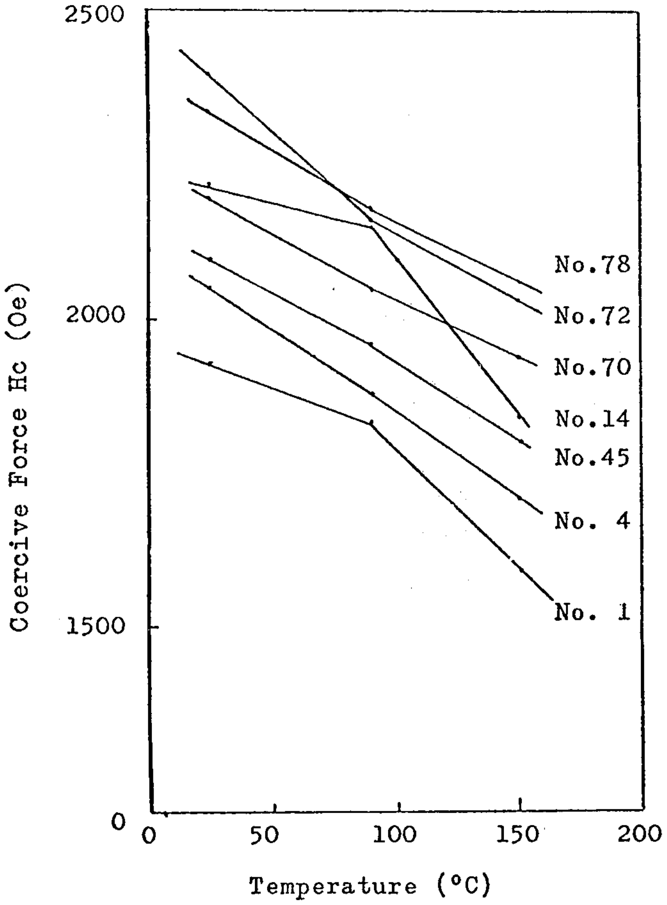
FIG. 3 is a graph showing a temperature dependency of remanent induction for cobalt-substituted γ-ferric oxide added with some haloid compounds.

All of the claimed additives showed a higher remanent induction (Br) than 1850 gauss. Some curves showing a temperature dependency of the remanent induction are given in FIG. 3.

Outstanding examples of the present invention are the following; No. 1, No. 20–No. 43, No. 121, No. 129 No. 141, No. 149, No. 191, No. 199, No. 221, No. 228, No. 321, No. 328, No. 421, No. 429, No. 721, No. 729, No. 1021, and No. 1029.

Table 1

| Sample No. | Additives to γ-$(Fe_{0.97}Co_{0.03})_2O_3$ | Added amount (mol%) | Coercive force Hc(Oe) 25°C | 80°C | 150°C | Hc(80°C)/Hc(25°C) | Remanent induction Br(gauss) 25°C | 80°C | 150°C | Br(80°C)/Br(25°C) |
|---|---|---|---|---|---|---|---|---|---|---|
| 1 | no additives | — | 380 | 290 | 190 | 0.76 | 1930 | 1830 | 1590 | 0.95 |
| 2 | $NH_4Cl$ | 3 | 450 | 350 | 240 | 0.78 | 1920 | 1700 | 1480 | 0.89 |
| 3 | " | 10 | 420 | 330 | 230 | 0.79 | 1910 | 1680 | 1460 | 0.88 |
| 4 | CuCl | 3 | 520 | 440 | 310 | 0.85 | 2050 | 1880 | 1710 | 0.92 |
| 5 | " | 10 | 470 | 360 | 280 | 0.77 | 1980 | 1830 | 1620 | 0.92 |
| 6 | LiCl | 3 | 450 | 380 | 270 | 0.84 | 1980 | 1750 | 1620 | 0.88 |
| 7 | " | 10 | 420 | 360 | 250 | 0.86 | 1970 | 1750 | 1630 | 0.89 |
| 8 | $PbCl_2$ | 3 | 550 | 440 | 360 | 0.80 | 2090 | 1920 | 1780 | 0.92 |
| 9 | " | 10 | 420 | 320 | 220 | 0.76 | 2000 | 1900 | 1750 | 0.95 |
| 10 | $SnCl_2$ | 3 | 490 | 400 | 290 | 0.82 | 1970 | 1900 | 1670 | 0.96 |
| 11 | " | 10 | 430 | 360 | 250 | 0.84 | 1940 | 1860 | 1620 | 0.96 |
| 12 | $BaCl_2$ | 3 | 430 | 340 | 250 | 0.79 | 2040 | 1810 | 1620 | 0.89 |
| 13 | " | 10 | 390 | 310 | 210 | 0.80 | 1910 | 1780 | 1580 | 0.93 |
| 14 | $CdCl_2$ | 3 | 700 | 580 | 400 | 0.83 | 2220 | 2150 | 1840 | 0.97 |
| 15 | " | 10 | 550 | 430 | 280 | 0.78 | 1970 | 1890 | 1670 | 0.96 |
| 16 | $SrCl_2$ | 3 | 530 | 480 | 360 | 0.91 | 1860 | 1700 | 1590 | 0.91 |
| 17 | " | 10 | 420 | 330 | 230 | 0.79 | 1850 | 1700 | 1580 | 0.92 |
| 18 | $InCl_3$ | 3 | 520 | 410 | 300 | 0.79 | 2060 | 1980 | 1680 | 0.96 |
| 19 | " | 10 | 410 | 320 | 230 | 0.78 | 1950 | 1830 | 1650 | 0.94 |

Table 2

| Sample No. | Additives to γ-$(Fe_{0.97}Co_{0.03})_2O_3$ | Added amount (mol%) | Coercive force Hc(Oe) 25°C | 80°C | 150°C | Hc(80°C)/Hc(25°C) | Remanent induction Br(gauss) 25°C | 80°C | 150°C | Br(80°C)/Br(25°C) |
|---|---|---|---|---|---|---|---|---|---|---|
| 20 | AgCl | 3 | 340 | 290 | 230 | 0.75 | 2090 | 1890 | 1630 | 0.90 |
| 21 | " | 10 | 280 | 200 | 160 | 0.71 | 1850 | 1800 | 1750 | 0.97 |
| 22 | KCl | 3 | 350 | 270 | 190 | 0.77 | 2000 | 1830 | 1680 | 0.92 |
| 23 | " | 10 | 270 | 190 | 120 | 0.70 | 1950 | 1850 | 1740 | 0.95 |
| 24 | NaCl | 3 | 270 | 240 | 190 | 0.89 | 1960 | 1710 | 1550 | 0.87 |
| 25 | " | 10 | 230 | 180 | 150 | 0.78 | 1630 | 1520 | 1120 | 0.93 |
| 26 | $NiCl_2$ | 3 | 350 | 300 | 240 | 0.86 | 1940 | 1870 | 1710 | 0.96 |
| 27 | " | 10 | 280 | 220 | 160 | 0.79 | 1320 | 1160 | 970 | 0.88 |
| 28 | $PdCl_2$ | 3 | 230 | 180 | 150 | 0.78 | 1900 | 1580 | 1420 | 0.83 |
| 29 | " | 10 | 260 | 190 | 160 | 0.73 | 1870 | 1630 | 1470 | 0.87 |
| 30 | $ZnCl_2$ | 3 | 360 | 290 | 210 | 0.81 | 1960 | 1690 | 1500 | 0.86 |
| 31 | " | 10 | 230 | 160 | 130 | 0.70 | 1680 | 1220 | 1000 | 0.73 |
| 32 | $CaCl_2$ | 3 | 380 | 300 | 230 | 0.79 | 1380 | 1220 | 990 | 0.88 |
| 33 | " | 10 | 310 | 240 | 180 | 0.77 | 1560 | 1320 | 1140 | 0.85 |
| 34 | $MgCl_2$ | 3 | 290 | 240 | 190 | 0.83 | 1770 | 1620 | 1400 | 0.92 |
| 35 | " | 10 | 220 | 160 | 140 | 0.73 | 1790 | 1610 | 1390 | 0.90 |
| 36 | $MnCl_2$ | 3 | 310 | 260 | 200 | 0.84 | 1950 | 1730 | 1430 | 0.89 |
| 37 | " | 10 | 320 | 260 | 210 | 0.81 | 1780 | 1460 | 1320 | 0.82 |
| 38 | $YCl_3$ | 3 | 350 | 290 | 230 | 0.83 | 1180 | 1110 | 960 | 0.94 |
| 39 | " | 10 | 340 | 270 | 200 | 0.79 | 980 | 960 | 880 | 0.98 |
| 40 | $GdCl_3$ | 3 | 350 | 290 | 220 | 0.83 | 1440 | 1280 | 1130 | 0.89 |
| 41 | " | 10 | 330 | 270 | 200 | 0.82 | 1510 | 1320 | 1200 | 0.87 |
| 42 | $LaCl_3$ | 3 | 360 | 290 | 230 | 0.81 | 1510 | 1360 | 1210 | 0.90 |
| 43 | " | 10 | 230 | 170 | 120 | 0.74 | 1820 | 1610 | 1470 | 0.89 |

Table 3

| Sample No. | Added amount of CuCl to γ-$(Fe_{0.97}Co_{0.03})_2O_3$ (mol%) | Coercive force Hc (Oe) 25°C | 80°C | 150°C | Hc(80°C)/Hc(25°C) | Remanent induction Br (gauss) 25°C | 80°C | 150°C | Br(80°C)/Br(25°C) |
|---|---|---|---|---|---|---|---|---|---|
| 1 | 0 | 380 | 290 | 190 | 0.76 | 1930 | 1830 | 1590 | 0.95 |
| 121 | 0.2 | 390 | 280 | 190 | 0.72 | 1950 | 1830 | 1570 | 0.94 |
| 122 | 0.5 | 450 | 350 | 240 | 0.78 | 1990 | 1890 | 1710 | 0.95 |
| 123 | 1.0 | 470 | 370 | 250 | 0.79 | 2100 | 1950 | 1820 | 0.93 |
| 124 | 2.0 | 530 | 430 | 300 | 0.81 | 2090 | 1940 | 1800 | 0.93 |
| 4 | 3.0 | 520 | 440 | 310 | 0.85 | 2050 | 1880 | 1710 | 0.92 |
| 126 | 6.0 | 640 | 520 | 360 | 0.81 | 2160 | 1990 | 1840 | 0.92 |
| 5 | 10.0 | 470 | 360 | 280 | 0.77 | 1980 | 1830 | 1620 | 0.92 |
| 128 | 15.0 | 480 | 360 | 280 | 0.75 | 1990 | 1850 | 1700 | 0.93 |
| 129 | 20.0 | 380 | 270 | 160 | 0.71 | 1900 | 1790 | 1430 | 0.94 |

Table 4

| Sample NO. | Added amount of $PbCl_2$ to γ-$(Fe_{0.97}Co_{0.03})_2O_3$ (mol%) | Coercive force Hc (Oe) 25°C | 80°C | 150°C | Hc(80°C)/Hc(25°C) | Remanent induction Br (gauss) 25°C | 80°C | 150°C | Br(80°C)/Br(25°C) |
|---|---|---|---|---|---|---|---|---|---|
| 1 | 0 | 380 | 290 | 190 | 0.76 | 1930 | 1830 | 1590 | 0.95 |

Table 4-continued

| Sample NO. | Added amount of $PbCl_2$ to $\gamma$-$(Fe_{0.97}Co_{0.03})_2O_3$ (mol%) | Coercive force Hc (Oe) 25°C | 80°C | 150°C | Hc(80°C)/Hc(25°C) | Remanent induction Br (gauss) 25°C | 80°C | 150°C | Br(80°C)/Br(25°C) |
|---|---|---|---|---|---|---|---|---|---|
| 141 | 0.2 | 370 | 280 | 180 | 0.76 | 1970 | 1850 | 1600 | 0.94 |
| 142 | 0.5 | 450 | 390 | 300 | 0.87 | 2090 | 1980 | 1800 | 0.95 |
| 143 | 1.0 | 550 | 440 | 350 | 0.80 | 2080 | 1970 | 1790 | 0.95 |
| 144 | 2.0 | 570 | 450 | 350 | 0.79 | 2100 | 1980 | 1790 | 0.94 |
| 8 | 3.0 | 550 | 440 | 360 | 0.80 | 2090 | 1920 | 1780 | 0.92 |
| 146 | 6.0 | 530 | 420 | 350 | 0.79 | 2100 | 1970 | 1790 | 0.94 |
| 9 | 10.0 | 420 | 320 | 220 | 0.76 | 2000 | 1900 | 1750 | 0.95 |
| 148 | 15.0 | 400 | 330 | 220 | 0.83 | 1980 | 1890 | 1730 | 0.96 |
| 149 | 20.0 | 270 | 200 | 160 | 0.74 | 1850 | 1800 | 1640 | 0.97 |

Table 5

| Sample No. | Added amount of $InCl_3$ to $\gamma$-$(Fe_{0.97}Co_{0.03})_2O_3$ (mol%) | Coercive force Hc (Oe) 25°C | 80°C | 150°C | Hc(80°C)/Hc(25°C) | Remanent induction Br (gauss) 25°C | 80°C | 150°C | Br(80°C)/Br(25°C) |
|---|---|---|---|---|---|---|---|---|---|
| 1 | 0 | 380 | 290 | 190 | 0.76 | 1930 | 1830 | 1590 | 0.95 |
| 191 | 0.2 | 380 | 290 | 180 | 0.76 | 1940 | 1810 | 1600 | 0.93 |
| 192 | 0.5 | 490 | 400 | 290 | 0.82 | 2100 | 1950 | 1710 | 0.93 |
| 193 | 1.0 | 520 | 420 | 300 | 0.81 | 2060 | 1930 | 1680 | 0.94 |
| 194 | 2.0 | 540 | 420 | 290 | 0.78 | 2120 | 1990 | 1900 | 0.94 |
| 18 | 3.0 | 520 | 410 | 300 | 0.79 | 2060 | 1980 | 1680 | 0.96 |
| 196 | 6.0 | 450 | 390 | 290 | 0.87 | 2110 | 2000 | 1910 | 0.95 |
| 19 | 10.0 | 410 | 320 | 230 | 0.78 | 1950 | 1830 | 1650 | 0.94 |
| 198 | 15.0 | 430 | 340 | 250 | 0.79 | 2020 | 1930 | 1700 | 0.96 |
| 199 | 20.0 | 350 | 280 | 190 | 0.80 | 1650 | 1470 | 1410 | 0.89 |

Table 6.

mol% of CuCl.)

| Sample No. | Doped amount of Co (atomic %) | Coercive force Hc (Oe) 25°C | 80°C | 150°C | Hc(80°C)/Hc(25°C) | Remanent induction Br (gauss) 25°C | 80°C | 150°C | Br(80°C)/Br(25°C) |
|---|---|---|---|---|---|---|---|---|---|
| 221 | 0.2 | 320 | 260 | 200 | 0.81 | 2020 | 1860 | 1650 | 0.92 |
| 222 | 0.5 | 390 | 330 | 260 | 0.85 | 2110 | 2000 | 1950 | 0.95 |
| 223 | 1.0 | 400 | 340 | 270 | 0.85 | 2070 | 1950 | 1870 | 0.94 |
| 224 | 2.0 | 450 | 390 | 320 | 0.87 | 2160 | 2020 | 1980 | 0.94 |
| 4 | 3.0 | 520 | 440 | 310 | 0.85 | 2050 | 1880 | 1710 | 0.92 |
| 226 | 6.0 | 700 | 490 | 370 | 0.70 | 2250 | 1960 | 1800 | 0.87 |
| 227 | 10.0 | 990 | 690 | 440 | 0.70 | 2500 | 2160 | 1980 | 0.86 |
| 228 | 15.0 | 1100 | 700 | 440 | 0.64 | 2530 | 2100 | 1950 | 0.83 |

Table 7.

(With addition of 10 mol% of CuCl.)

| Sample No. | Doped amount of Co (atomic %) | Coercive force Hc (Oe) 25°C | 80°C | 150°C | Hc(80°C)/Hc(25°C) | Remanent induction Br (gauss) 25°C | 80°C | 150°C | Br(80°C)/Br(25°C) |
|---|---|---|---|---|---|---|---|---|---|
| 321 | 0.2 | 290 | 220 | 180 | 0.76 | 1950 | 1830 | 1690 | 0.94 |
| 322 | 0.5 | 390 | 340 | 260 | 0.87 | 1970 | 1850 | 1720 | 0.94 |
| 323 | 1.0 | 390 | 350 | 260 | 0.90 | 2030 | 1940 | 1800 | 0.96 |
| 324 | 2.0 | 440 | 350 | 270 | 0.80 | 2120 | 2000 | 1930 | 0.94 |
| 5 | 3.0 | 470 | 360 | 280 | 0.77 | 1980 | 1830 | 1620 | 0.92 |
| 326 | 6.0 | 520 | 390 | 280 | 0.75 | 2230 | 2110 | 1940 | 0.95 |
| 327 | 10.0 | 650 | 450 | 300 | 0.69 | 2390 | 2150 | 1990 | 0.90 |
| 328 | 15.0 | 700 | 450 | 320 | 0.64 | 2500 | 2100 | 1950 | 0.84 |

Table 8

| Sample No. | Additives to $\gamma$-$(Fe_{0.97}Co_{0.03})_2O_3$ | Added amount (mol%) | Coercive force Hc(Oe) 25°C | 80°C | 150°C | Hc(80°C)/Hc(25°C) | Remanent induction Br(gauss) 25°C | 80°C | 150°C | Br(80°C)/Br(25°C) |
|---|---|---|---|---|---|---|---|---|---|---|
| 44 | $NH_4Br$ | 3 | 390 | 320 | 270 | 0.82 | 2090 | 1960 | 1850 | 0.94 |
| 45 | " | 10 | 380 | 310 | 260 | 0.82 | 2100 | 1960 | 1800 | 0.93 |
| 46 | $NH_4I$ | 3 | 410 | 340 | 250 | 0.83 | 2080 | 1970 | 1860 | 0.95 |
| 47 | " | 10 | 390 | 330 | 270 | 0.85 | 2070 | 1960 | 1830 | 0.95 |
| 48 | $NH_4F$ | 3 | 440 | 370 | 270 | 0.84 | 2090 | 1950 | 1820 | 0.93 |
| 49 | " | 10 | 410 | 350 | 250 | 0.85 | 2040 | 1930 | 1760 | 0.95 |
| 50 | CuBr | 3 | 510 | 420 | 300 | 0.82 | 2050 | 1960 | 1740 | 0.95 |

Table 8-continued

| Sample No. | Additives to $\gamma$-$(Fe_{0.97}Co_{0.03})_2O_3$ | Added amount (mol%) | Coercive force Hc(Oe) 25°C | 80°C | 150°C | Hc(80°C)/Hc(25°C) | Remanent induction Br(gauss) 25°C | 80°C | 150°C | Br(80°C)/Br(25°C) |
|---|---|---|---|---|---|---|---|---|---|---|
| 51 | " | 10 | 400 | 330 | 240 | 0.83 | 2030 | 1950 | 1720 | 0.96 |
| 52 | CuI | 3 | 460 | 370 | 270 | 0.80 | 2050 | 1920 | 1730 | 0.94 |
| 53 | " | 10 | 450 | 360 | 250 | 0.80 | 2090 | 1940 | 1850 | 0.93 |
| 54 | CuF | 3 | 480 | 360 | 270 | 0.75 | 2050 | 1930 | 1820 | 0.94 |
| 55 | " | 10 | 430 | 340 | 250 | 0.79 | 2030 | 1900 | 1790 | 0.94 |
| 56 | LiBr | 3 | 480 | 410 | 270 | 0.85 | 2080 | 1970 | 1890 | 0.95 |
| 57 | " | 10 | 400 | 350 | 240 | 0.88 | 2050 | 1970 | 1870 | 0.96 |
| 58 | LiI | 3 | 390 | 320 | 270 | 0.82 | 2070 | 1960 | 1830 | 0.95 |
| 59 | " | 10 | 390 | 310 | 260 | 0.79 | 2030 | 1930 | 1800 | 0.95 |
| 60 | LiF | 3 | 480 | 400 | 270 | 0.83 | 2090 | 1970 | 1860 | 0.94 |
| 61 | " | 10 | 410 | 340 | 240 | 0.83 | 2050 | 1950 | 1850 | 0.95 |
| 62 | $PbBr_2$ | 3 | 530 | 430 | 320 | 0.81 | 2090 | 1980 | 1830 | 0.95 |
| 63 | " | 10 | 390 | 330 | 280 | 0.85 | 2090 | 1970 | 1820 | 0.94 |
| 64 | $PbI_2$ | 3 | 570 | 450 | 340 | 0.79 | 2130 | 2000 | 1860 | 0.94 |
| 65 | " | 10 | 400 | 330 | 270 | 0.83 | 2090 | 1960 | 1830 | 0.94 |
| 66 | $PbF_2$ | 3 | 620 | 470 | 350 | 0.76 | 2090 | 2000 | 1940 | 0.96 |
| 67 | " | 10 | 450 | 390 | 310 | 0.87 | 2150 | 2030 | 1900 | 0.94 |
| 68 | $SnBr_2$ | 3 | 430 | 340 | 230 | 0.79 | 2090 | 1990 | 1870 | 0.95 |
| 69 | " | 10 | 380 | 300 | 200 | 0.79 | 2200 | 2080 | 1960 | 0.95 |
| 70 | $SnI_2$ | 3 | 390 | 310 | 210 | 0.79 | 2200 | 2050 | 1940 | 0.93 |
| 71 | " | 10 | 430 | 330 | 220 | 0.77 | 1970 | 1860 | 1770 | 0.94 |
| 72 | $SnF_2$ | 3 | 420 | 320 | 220 | 0.76 | 2400 | 2160 | 2030 | 0.90 |
| 73 | " | 10 | 400 | 310 | 210 | 0.78 | 2200 | 2020 | 1930 | 0.92 |
| 74 | $BaBr_2$ | 3 | 500 | 400 | 300 | 0.80 | 2200 | 2040 | 1930 | 0.93 |
| 75 | " | 10 | 390 | 310 | 220 | 0.79 | 2180 | 2020 | 1900 | 0.93 |
| 76 | $BaI_2$ | 3 | 390 | 320 | 210 | 0.82 | 2140 | 2010 | 1910 | 0.94 |
| 77 | " | 10 | 370 | 300 | 200 | 0.79 | 2100 | 1990 | 1910 | 0.95 |
| 78 | $BaF_2$ | 3 | 400 | 320 | 230 | 0.80 | 2340 | 2180 | 2060 | 0.93 |
| 79 | " | 10 | 380 | 310 | 200 | 0.82 | 2180 | 2000 | 1890 | 0.92 |
| 80 | $CoBr_2$ | 3 | 520 | 420 | 310 | 0.81 | 2130 | 2010 | 1940 | 0.94 |
| 81 | " | 10 | 410 | 310 | 220 | 0.76 | 1980 | 1870 | 1790 | 0.94 |
| 82 | $CdI_2$ | 3 | 470 | 360 | 250 | 0.77 | 2160 | 2070 | 1990 | 0.96 |
| 83 | " | 10 | 420 | 320 | 210 | 0.76 | 2050 | 1940 | 1850 | 0.95 |
| 84 | $CdF_2$ | 3 | 600 | 490 | 350 | 0.82 | 2160 | 2000 | 1920 | 0.93 |
| 85 | " | 10 | 400 | 310 | 220 | 0.78 | 2040 | 1930 | 1820 | 0.95 |
| 86 | $SrBr_2$ | 3 | 450 | 340 | 240 | 0.76 | 2100 | 1980 | 1870 | 0.94 |
| 87 | " | 10 | 390 | 300 | 210 | 0.77 | 2020 | 1950 | 1820 | 0.97 |
| 88 | $SrI_2$ | 3 | 500 | 410 | 280 | 0.82 | 2200 | 1990 | 1800 | 0.90 |
| 89 | " | 10 | 420 | 320 | 200 | 0.76 | 1980 | 1880 | 1760 | 0.95 |
| 90 | $SrF_2$ | 3 | 540 | 430 | 300 | 0.80 | 2100 | 1980 | 1900 | 0.94 |
| 91 | " | 10 | 410 | 330 | 220 | 0.80 | 2100 | 1990 | 1850 | 0.95 |
| 92 | $InBr_3$ | 3 | 500 | 420 | 310 | 0.84 | 2190 | 2020 | 1920 | 0.92 |
| 93 | " | 10 | 420 | 330 | 280 | 0.79 | 2150 | 2000 | 1890 | 0.93 |
| 94 | $InI_3$ | 3 | 400 | 320 | 200 | 0.80 | 2190 | 2010 | 1940 | 0.92 |
| 95 | " | 10 | 390 | 300 | 200 | 0.78 | 2040 | 1920 | 1800 | 0.94 |
| 96 | $InF_3$ | 3 | 430 | 330 | 290 | 0.77 | 2250 | 2100 | 1980 | 0.93 |
| 97 | " | 10 | 390 | 310 | 200 | 0.79 | 1900 | 1860 | 1740 | 0.98 |

Table 9

| Sample No. | Additives to $\gamma$-$(Fe_{0.97}Co_{0.03})_2O_3$ | Added amount (mol%) | Coercive force Hc (Oe) 25°C | 80°C | 150°C | Hc(80°C)/Hc(25°C) | Remanent induction Br(gauss) 25°C | 80°C | 150°C | Br(80°C)/Br(25°C) |
|---|---|---|---|---|---|---|---|---|---|---|
| 1 | CuBr | 0 | 380 | 290 | 190 | 0.76 | 1930 | 1830 | 1590 | 0.95 |
| 421 | " | 0.2 | 310 | 250 | 190 | 0.81 | 2010 | 1870 | 1660 | 0.93 |
| 422 | " | 0.5 | 350 | 300 | 250 | 0.86 | 2040 | 1950 | 1730 | 0.96 |
| 423 | " | 1.0 | 370 | 310 | 260 | 0.84 | 2070 | 1970 | 1750 | 0.95 |
| 80 | " | 3.0 | 510 | 420 | 300 | 0.82 | 2050 | 1960 | 1740 | 0.96 |
| 81 | " | 10.0 | 400 | 330 | 240 | 0.83 | 2030 | 1950 | 1720 | 0.96 |
| 428 | " | 15.0 | 420 | 340 | 250 | 0.81 | 2060 | 1920 | 1700 | 0.93 |
| 429 | " | 20.0 | 290 | 240 | 190 | 0.83 | 2000 | 1820 | 1640 | 0.91 |
| 721 | CuI | 0.2 | 320 | 250 | 180 | 0.78 | 2010 | 1860 | 1660 | 0.93 |
| 722 | " | 0.5 | 370 | 320 | 260 | 0.86 | 2030 | 1950 | 1730 | 0.96 |
| 723 | " | 1.0 | 400 | 340 | 250 | 0.85 | 2030 | 1890 | 1700 | 0.93 |
| 82 | " | 3.0 | 460 | 370 | 270 | 0.80 | 2050 | 1920 | 1730 | 0.94 |
| 83 | " | 10.0 | 450 | 360 | 250 | 0.80 | 2090 | 1940 | 1850 | 0.93 |
| 728 | " | 15.0 | 480 | 380 | 270 | 0.79 | 2000 | 1880 | 1680 | 0.94 |
| 729 | " | 20.0 | 360 | 270 | 220 | 0.75 | 1920 | 1720 | 1580 | 0.90 |
| 1021 | CuF | 0.2 | 290 | 210 | 170 | 0.72 | 2020 | 1850 | 1570 | 0.92 |
| 1022 | " | 0.5 | 360 | 290 | 200 | 0.81 | 2100 | 1950 | 1840 | 0.93 |
| 1023 | " | 1.0 | 420 | 320 | 230 | 0.76 | 2080 | 1960 | 1860 | 0.94 |
| 84 | " | 3.0 | 480 | 360 | 270 | 0.75 | 2050 | 1930 | 1820 | 0.94 |
| 85 | " | 10.0 | 430 | 340 | 250 | 0.79 | 2030 | 1900 | 1790 | 0.94 |
| 1028 | " | 15.0 | 400 | 300 | 200 | 0.75 | 2030 | 1900 | 1800 | 0.94 |
| 1029 | " | 20.0 | 290 | 210 | 150 | 0.72 | 1970 | 1850 | 1620 | 0.94 |

What is claimed is:

1. A method of preparing a magnetic powder consisting mainly of cobalt-substituted $\gamma$-ferric oxide, which essentially comprises dispersing acicular powder of goethite into an aqueous solution of a cobalt compound, precipitating all of the cobalt ions in the form of cobalt hydroxide by addition of a precipitating reagent into the aqueous solution of cobalt compound, filtering the resultant mixture of goethite and cobalt hydroxide, the atomic percent of Fe in said goethite-cobalt hydroxide mixture being 90.0 to 99.5 and the atomic % of Co being 0.5 to 10.0, mixing 0.5 to 15 mol. % in total, of at least one halide selected from the group consisting of $NH_4X$, CuX, LiX, $PbX_2$, $SnX_2$, $BaX_2$, $CdX_2$, $SrX_2$ and $InX_3$, wherein X is F, Cl, Br or I, with 85 to 99.5 mol. % of the mixture of goethite and cobalt hydroxide, heating the final mixture at a temperature from 300°C to 600°C in a reducing gas atmosphere, and finally oxidizing the final mixture at a temperature from 150°C to 350°C in air or oxygen gas atmosphere.

2. A method as claimed in claim 1, wherein X is Br.

3. A method as claimed in claim 1, wherein X is I.

4. A method as claimed in claim 1, wherein X is F.

5. A method as claimed in claim 1, wherein said cobalt compound in an aqueous solution is at least one member selected from the group consisting of $CoSO_4$, $CoCl_2$, $Co(NO_3)_2$, and $Co(CH_3COO)_2$.

6. A method as claimed in claim 1, wherein said halide is $NH_4Cl$.

7. A method as claimed in claim 1, wherein said halide is CuCl.

8. A method as claimed in claim 1, wherein said halide is LiCl.

9. A method as claimed in claim 1, wherein said halide is $PbCl_2$.

10. A method as claimed in claim 1, wherein said halide is $SnCl_2$.

11. A method as claimed in claim 1, wherein said halide is $BaCl_2$.

12. A method as claimed in claim 1, wherein said halide is $SrCl_2$.

13. A method as claimed in claim 1, wherein said halide is $InCl_3$.

14. A method as claimed in claim 1, wherein X is Cl.

* * * * *